(12) United States Patent
Feinberg et al.

(10) Patent No.: US 9,440,292 B1
(45) Date of Patent: Sep. 13, 2016

(54) DISPOSABLE SURGICAL ROD DEBURRER

(71) Applicant: RPH Enterprises, Inc., Wellesley, MA (US)

(72) Inventors: Arnold Feinberg, Stoughton, MA (US); Frank Slauenwhite, III, Woburn, MA (US); Luis A. Sousa, Cranston, RI (US)

(73) Assignee: RPH Enterprises, Inc., Wellesley, MA (US)

( * ) Notice: Subject to any disclaimer, the term of this patent is extended or adjusted under 35 U.S.C. 154(b) by 597 days.

(21) Appl. No.: 13/739,759

(22) Filed: Jan. 11, 2013

Related U.S. Application Data

(60) Provisional application No. 61/586,590, filed on Jan. 13, 2012.

(51) Int. Cl.
*B23C 3/12* (2006.01)
*B23B 5/16* (2006.01)
(Continued)

(52) U.S. Cl.
CPC ............... *B23B 5/16* (2013.01); *B23B 51/103* (2013.01); *B23C 3/122* (2013.01); *B23B 2220/08* (2013.01); *B23B 2260/058* (2013.01); *B23B 2270/30* (2013.01); *B23C 2220/20* (2013.01); *B23Q 11/0071* (2013.01); *B23Q 11/0891* (2013.01); *Y10T 408/50* (2015.01); *Y10T 408/566* (2015.01); *Y10T 409/304256* (2015.01); *Y10T 409/304424* (2015.01)

(58) Field of Classification Search
CPC ....... B23B 5/16; B23B 5/168; B23B 51/101; B23B 51/103; B23B 2260/058; B23B 2270/30; B23B 2220/08; B23C 3/122; B23C 3/126; B23C 3/12; B23C 2220/20; B23C 2220/16; B23Q 11/0071; B23Q 11/08; B23Q 11/0891

USPC .......... 409/134, 139, 140, 143; 408/67, 113, 408/211; 82/113, 128, 130, 131; 142/45
See application file for complete search history.

(56) References Cited

U.S. PATENT DOCUMENTS 3,335,526 A * 8/1967 Weiss ............................. 451/180
3,449,984 A 6/1969 Cogsdill
(Continued)

FOREIGN PATENT DOCUMENTS

DE 102004024025 A1 * 12/2005 ............... B23B 5/16
EP 799674 A1 * 10/1997 ............. B23Q 11/00

OTHER PUBLICATIONS

"Spine: Surgical Instruments," Spine Surgical Innovation, 2011, pp. 1-3.

*Primary Examiner* — Eric A Gates
(74) *Attorney, Agent, or Firm* — Cesari and McKenna, LLP; James A. Blanchette

(57) ABSTRACT

In one embodiment, a disposable surgical rode deburrer has a shank configured to be rotated by a drive device and a housing assembly coupled to the shank. The housing assembly includes a rod guide having an opening sized to receive and stabilize a surgical rod when inserted therethrough into an inner cavity. The housing assembly also includes a cutting bit disposed within the inner cavity that is rotated to deburr an end of the surgical rod. A membrane wiper is disposed between the rod guide and the cutting bit. The membrane wiper has a seal that opens to allow the surgical rod to be inserted therethrough, and substantially closes when the surgical rod is removed. The housing assembly also includes a drive body. The membrane wiper retains within the inner cavity chips, particles or dust created by the cutting bit.

16 Claims, 4 Drawing Sheets

(51) Int. Cl.
*B23B 51/10* (2006.01)
*B23Q 11/08* (2006.01)
*B23Q 11/00* (2006.01)

(56) References Cited

U.S. PATENT DOCUMENTS

| | | | |
|---|---|---|---|
| 3,535,900 A * | 10/1970 | Isaacs | 72/40 |
| 3,581,612 A * | 6/1971 | Jackman | B23B 5/12 |
| | | | 82/130 |
| 3,760,662 A * | 9/1973 | Brock | 82/157 |
| 4,251,171 A * | 2/1981 | Brett | 408/67 |
| 4,838,136 A * | 6/1989 | Kress | B23B 29/16 |
| | | | 407/11 |
| 5,076,122 A * | 12/1991 | Katzenburger et al. | 82/113 |
| 5,346,341 A * | 9/1994 | Jambor | 409/132 |
| 6,101,915 A * | 8/2000 | Sinclair | 86/24 |
| 6,412,376 B1 * | 7/2002 | Borgia, Jr. | 82/113 |
| 6,968,761 B2 * | 11/2005 | Frank | 82/113 |
| 8,292,554 B2 | 10/2012 | Heule | |
| 8,827,607 B1 * | 9/2014 | Goodman | 409/131 |
| 9,022,704 B1 * | 5/2015 | Goodman | 409/131 |
| 9,073,161 B2 * | 7/2015 | Tseng | |
| 2010/0111631 A1 | 5/2010 | Trieu | |
| 2012/0309279 A1 | 12/2012 | Okoshi et al. | |

* cited by examiner

DISPOSABLE SURGICAL ROD DEBURRER

The present application claims priority to U.S. Provisional Patent Application No. 61/586,590 titled "Disposable Surgical Rod Deburrer", filed by Feinberg et al., on Jan. 13, 2012, the contents of which are incorporated by reference herein in their entirety.

BACKGROUND

1. Technical Field

The present invention relates generally to surgical instruments and more specifically to instruments for deburring a surgical rod.

2. Background Information

Surgeons commonly treat acute, chronic or traumatic injuries to the musculoskeletal system by stabilizing injured structures with implants. These implants restrict motion of the structures, to promote fusion or other healing. A variety of types of implants use one or more custom-length surgical rods. Such surgical rods are typically cylinders made from surgical grade-stainless steel, titanium alloys, cobalt-chrome or other hardened metals. The diameters of surgical rods may vary, depending on the particular application. Surgical rods are typically supplied by manufacturers in predetermined lengths, and often cut to custom length during a surgical procedure.

While surgical rods are used in many different types of surgeries, one common use is in spinal fixation surgery. In spinal fixation surgery, a surgeon typically accesses the spine via a small incision and secures two or more bone screws into vertebrae. The surgeon then affixes a spinal fixation rod, a type of surgical rod, to the bone screws. In some cases, the surgical rod may pass through holes in the bone screws and be fastened in place via set screws, or other types of fasteners. The vertebrae are held in a desired spatial relationship by the surgical rod, until spinal fusion or other healing occurs.

As in other applications, in spine fixation surgery, the surgical rod typically must be custom-cut to length. Often, the exact length is not known until the surgical procedure is about to commence, or is already underway. Accordingly, a surgeon typically must cut the surgical rod in the operating room, or nearby, so as to not unduly delay the surgery.

A variety of different types of surgical rod cutters have been developed to cut surgical rods in a sterile surgical environment, such as an operating room or other hospital space. Center cut-type surgical rod cutters (which often resemble traditional bolt cutters) may use opposing blades that are urged together under force to cut a surgical rod. Sheer-type surgical rod cutters often use movable cylinders having a bore hole. Initially, the bore hole is aligned through the cylinders, so that the surgical rod can be inserted there through. When urged under force into misalignment, substantial sheer forces are imposed on the rod, sheering it in two.

While many surgical rod cutters succeed in cutting surgical rods to an appropriate length, as a byproduct of their cutting action, they may produce a sharp burr or other type of jagged edge on the end of the surgical rod. For example, some center cut-type surgical rod cutters leave a burr down the middle of a surgical rod, where the opposing blades eventually meet. Likewise, some sheer-type surgical rod cutters leave a burr along about the circumference of the surgical rod. If a surgical rod with a burr is implanted in a patient, it could cause inflammation, leading to patient discomfort and complications.

While various devices have been used to deburr surgical rods, such devices suffer from a number of shortcomings. Many devices allow chips, particles and dust created during the deburring process to readily escape. This debris can contaminate the surgical environment where the deburring is being performed. Some devices are complicated and costly to manufacture. This leads to increased costs, which are passed down, ultimately, to patients and their healthcare providers. Further, some devices are difficult to sterilize, requiring time consuming disassembly or other operations. Accordingly, there is a need for an improved device that can used to deburr surgical rods.

SUMMARY

In one example embodiment, various shortcomings of prior devices are addressed by a disposable surgical rod deburrer that retains substantially all chips, particles and dust created as a result of deburring an end of a surgical rod within an inner cavity of the disposable surgical rod deburrer, to be disposed of along with the surgical rod deburrer after a single-use. A surgical rod is inserted into the disposable surgical rod deburrer. The disposable surgical rod deburrer is then rotated by a drive device, and deburrs the end of the surgical rod. The surgical rod is then removed with the chips, particles and dust created as a result of deburring retained inside.

In the one example embodiment, the disposable surgical rod deburrer includes a shank and a housing assembly. The housing assembly includes a rod guide has an opening sized to receive and stabilize the surgical rod. The rod guide is partially surrounded by a distal cap, and held thereto, by a retaining nut. In some implementations, the rod guide is allowed to freely rotate with respect to the distal cap, and the rest of the disposable surgical rod deburrer. A membrane wiper is retained between the rod guide and the retaining nut. In one implementation, the membrane wiper has an iris seal formed from a number of bisecting slits that open to allow the surgical rod to be interested through the membrane wiper into the inner cavity, and substantially close again when the surgical rod is removed from the inner cavity. To the proximal side of the membrane wiper, a cutting bit is disposed within the inner cavity. The cutting bit is held within a cutting bit holder. The cutting bit holder is rigidly coupled to a drive body, that encloses much of the inner cavity. The drive body is rigidly coupled to the distal cap with encloses a further portion of the inner cavity, and also coupled to a rear cap.

It should be understood that a variety of other embodiments are possible, that may include a subset of these components, adaptations these components, or different components that provide similar or complementary functions.

BRIEF DESCRIPTION OF THE DRAWINGS

The description below refers to the accompanying drawings of an example embodiment, of which.

DETAILED DESCRIPTION OF ILLUSTRATIVE EMBODIMENTS

Figure 1:
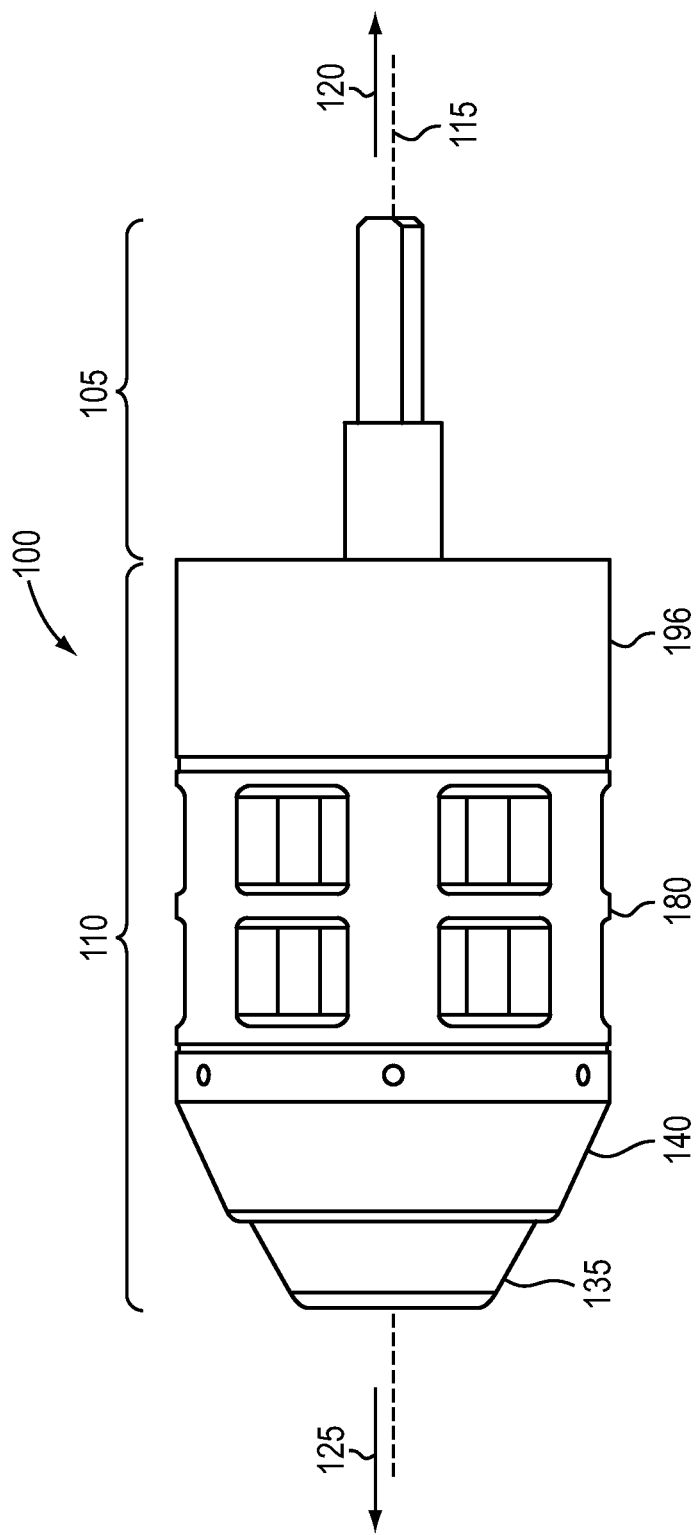
FIG. 1 is a side view of an example disposable surgical rod deburrer.
Figure 2:
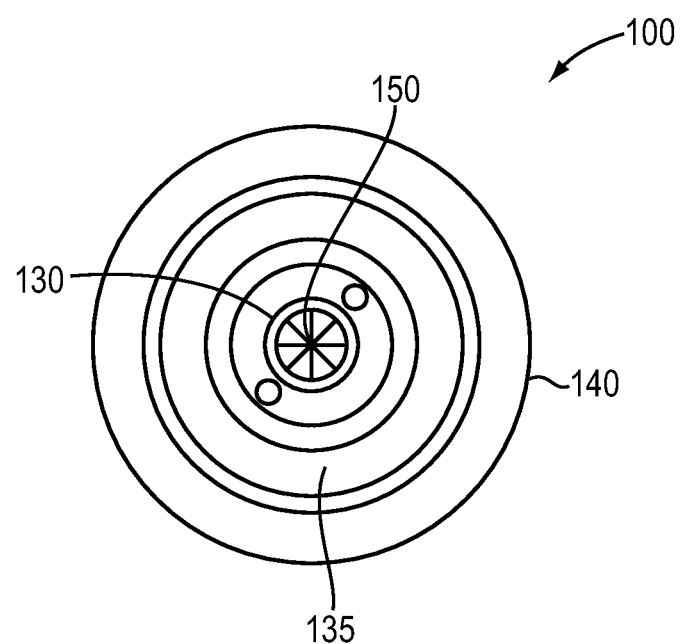
FIG. 2 is a front view of the example disposable surgical rod deburrer.
Figure 3:
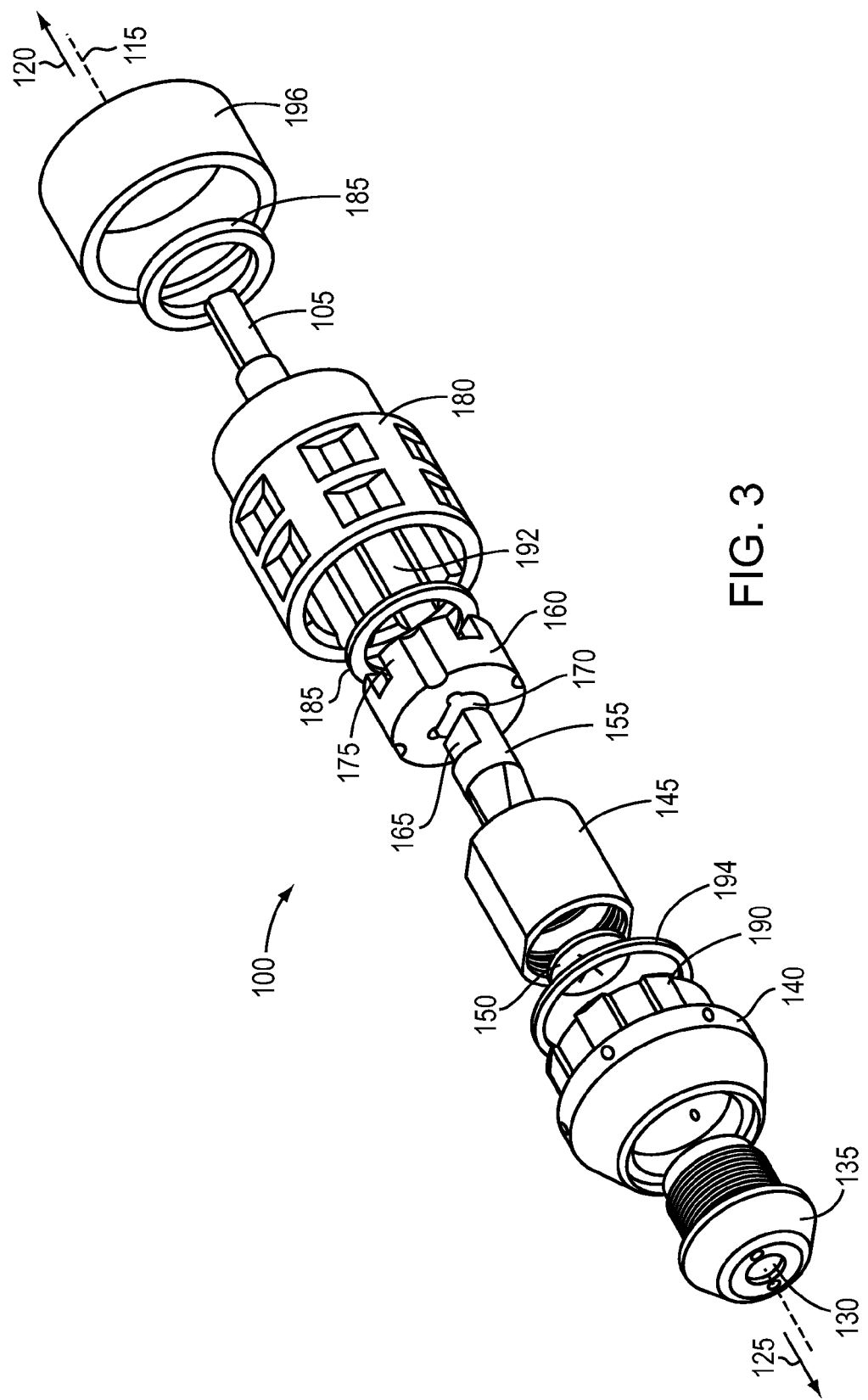
FIG. 3 is an exploded perspective view of the example disposable surgical rod deburrer.

Referring to FIGS. 1-3, in one example embodiment, an example disposable surgical rod deburrer 100 is provided. The disposable surgical rod deburrer 100 is designed to operate as a single-use product. As used herein, a single-use may constitute a single surgical rod deburring for one surgical procedure, or a limited number (e.g., 2-6) surgical rod deburrings for one surgical procedure, however does not include use for multiple, different surgical procedures. After its single-use, the disposable surgical rod deburrer 100 is intended to be disposed of as waste (e.g., as hazardous waste), with the chips, particles, and dust created by deburring retained therein. In this manner, the chips, particles and dust are safely removed from the surgical environment, reducing the risk of contamination with sharp metal debris.

The disposable surgical rod deburrer 100 includes a shank 105 at its proximal end, and a housing assembly 110 at its distal end, aligned along a major axis 115. The shank 105 is configured to be received by an adaptor (not shown) of a drive device, for example, a dill/reamer. The drill/reamer may rotate the disposable surgical rod deburrer 100 at a certain number of revolutions per unit time (e.g., revolution per minute (rpm)). The number of revolutions per unit time may be limited to a maximum supported by the rod deburrer (e.g., a maximum of 800 rpm).

The housing assembly 110 of the disposable surgical rod deburrer 100 includes a number of structures. A rod guide 135 has an opening sized to receive a surgical rod, which is slid into it in a proximal direction 120 along the major axis 115. The surgical rod may later be removed by sliding it back out, in a distal direction 125 along the major axis 115. The rod guide 135 is designed to stabilize the surgical rod while it passes therethrough, to prevent excessive lateral movement or skew that could cause the end-geometry of the rod to be compromised during deburring. The rod guide 135 may be sized to accommodate a range of surgical rod sizes (e.g., diameters of 3-4 millimeter (mm), 4-5 mm, 5-6 mm, or some other range). Alternatively, the rod guide may be sized to accommodate only a single size of surgical rod.

The rod guide 135 is partially surrounded by a distal cap 140. In some implementations, the rod guide 135 is allowed to freely rotate with respect to the distal cap 140 and the other portions of the disposable surgical rod deburrer 100. In such an implementation, a threaded portion of the rod guide may extend through the distal cap 140, and engage a retaining nut 145, holding the rod guide 135 within the distal cap 140, yet allowing it to rotate. The retaining nut 145 may be constructed from a metal, such as aluminum. The free rotation may help prevent scoring or scratching of the surgical rod. During debarring, should the surgical rod contact the rod guide 135, rather than rub upon the surgical rod, the rod guide 135 may simply rotate. The rod guide 135 may be constructed from an implantable grade material, for example medical grade ultra-high-molecular-weight polyethylene (UHMWPE).

A membrane wiper 150 works to retain chips, particles and dust created during the deburring process within the inner cavity of the surgical rod deburrer 100. The membrane wiper 150 may be located between the rod guide 135 and the retaining nut 145. The membrane wiper 150 has a seal that opens to allow the surgical rod to be interested through the membrane wiper 150 into the inner cavity, and substantially closes again when the surgical rod is removed from the inner cavity. In one implementation, the seal is an iris seal, formed from a number of bisecting slits, which allow the surgical rod to be inserted through the point where each of the slits meet. In another implementation, the seal is a circular seal. The membrane wiper 150 may be formed from an elastic material, such as silicon rubber.

To proximal side of the membrane wiper 150, a cutting bit 155 provided. The cutting bit rotates when the shank 105 is rotated. The cutting bit 155 acts to chamfers or round the edges, and smooth the end, of the surgical rod. The cutting bit 155 may be machined as an endmill, or differently formed. Substantially all chips, particles and dust created as a result of cutting bit's action become deposited within the inner cavity and are held therein.

The cutting bit 155 is rigidly coupled to a cutting bit holder 160 by a mechanical connection that prevents rotation there between. For example, a slotted portion 165 of the cutting bit 155 may extend into a corresponding recess 170 of the cutting bit holder 160, the profile of the slotted portion 165 and recess 170 preventing rotation.

The cutting bit holder 160 is rigidly coupled to a drive body 180. For example, one or more teeth 175 formed into the proximal end of the cutting bit holder 160 may engage corresponding slots of the drive body 180, providing a mechanical connection that prevents rotation therebetween. Further, an adhesive 185, for example, Room Temperature Vulcanizing (RTV) silicone may also be employed to affix the cutting bit holder 160 to the drive body 180.

The drive body 180 is also rigidly coupled to the distal cap 140. For example, one or more teeth 190 of the distal cap 140 may engage corresponding slots 192 formed within the drive body 180, providing a mechanical connection that prevents rotation therebetween. Further, an adhesive 194, for example, a medical device grade epoxy, may also be employed between the drive body 180 and the distal cap 140.

The drive body 180 is also affixed to a rear cap 196, for example, via an adhesive 185, such as RTV silicone. The rear cap may include markings written thereon. For example, the markings may indicate a range of surgical rod diameters supported by the discs posable surgical rod deburrer, a maximum number of revolutions per unit time, disposal instructions, product branding, and the like.

In order to ensure that the disposable surgical rod deburrer 100 is employed as a single-use product, one or more components of the disposable surgical rod deburrer (e.g., the rear cap 196, the distal cap 140, the drive body 180, etc.) may be constructed from a material (e.g., a plastic) that tolerates ethylene oxide (ETO) and/or gamma sterilization, but that substantially degrades (i.e., melts or otherwise significantly changes shape or appearance) when exposed to autoclave temperatures (e.g., 121° C. or greater). The substantial degradation discourages inadvertent reuse of the disposable surgical rod deburrer 100 by medical personnel, who commonly sterilize instruments between uses by subjecting them to high-temperature steam in an autoclave. The plastic may be acrylonitrile butadiene styrene (ABS), or another medical grade plastic, that offers these properties.

The disposable surgical rod deburrer 100 may be adapted for use with multiple different sizes, and/or ranges of sizes, of surgical rods, through the use of interchangeable components. For example, rod guides 130 of various sizes may be interchanged as appropriate. Further, various cutting bits 155 may be interchanged to accommodate different sizes, and to allow for different types of end finishing for surgical rods. The other components of the disposable surgical rod deburrer 100 may be maintained substantially the same.

Such interchange of components may occur during manufacturing, or subsequent thereto, by a distributor or even an end user.

Figure 4:
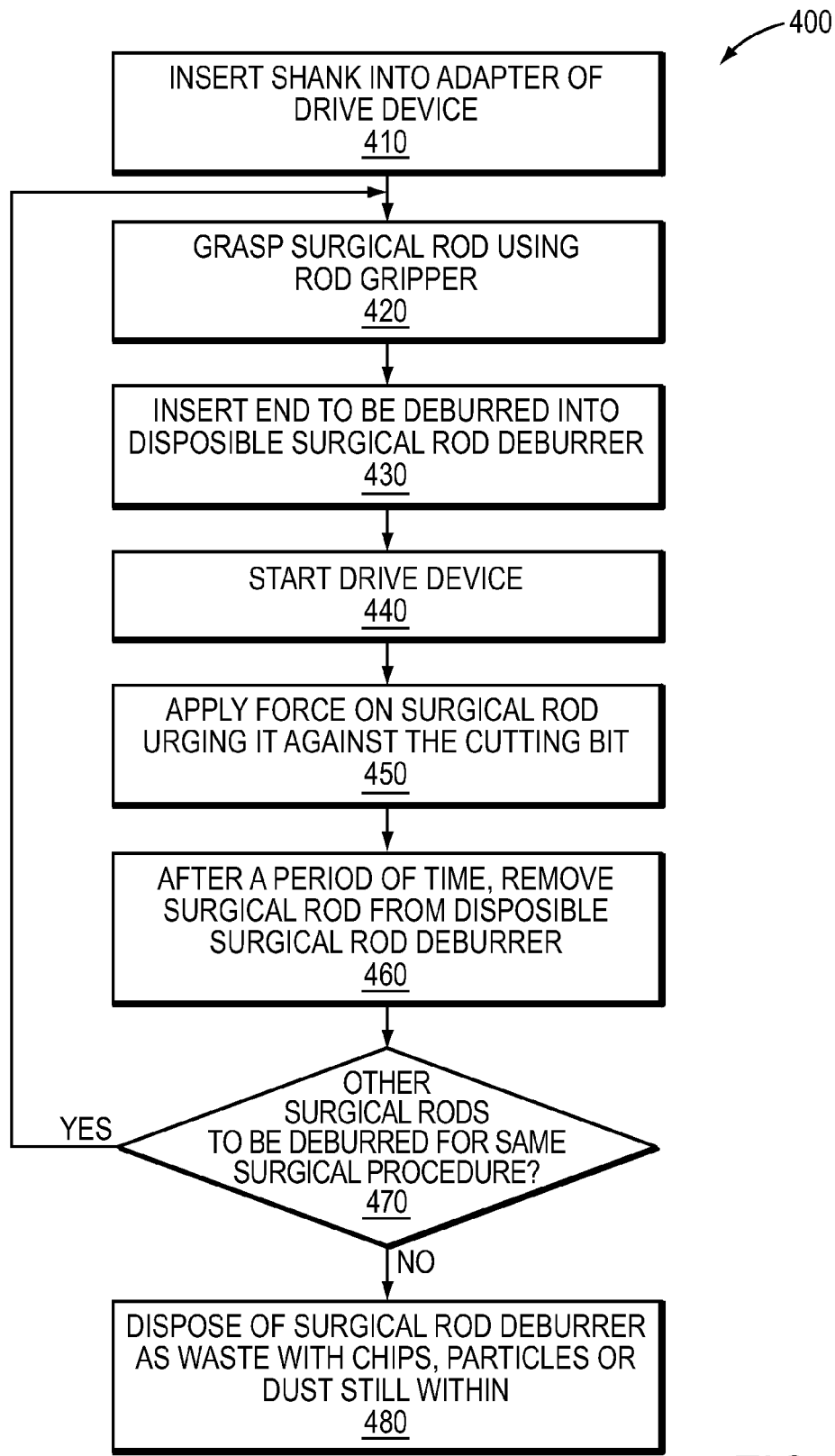
FIG. 4 is a flow chart of an example sequence of steps for using the example disposable surgical rod deburrer to deburr a surgical rod.

Referring to the steps 400 of FIG. 4, the disposable surgical rod deburrer 100 may be used in conjunction with a surgical procedure by following a number of step. First, at step 410, a user inserts the shank 105 into an adaptor (not shown) of a drive device (not shown), for example, a drill/reamer. At step 420, the user grasps a surgical rod using a rod gripper, such as a forceps or vice grips. In typical applications, the surgical rod may be gripped about 2 to 3 inches away from the end to be deburred. At step 430, the user inserts the end to be deburred into the disposable surgical rod deburrer 100, sliding it in a proximal direction 120 into the rod guide 135 through the membrane wiper 150, so the end is disposed within the inner cavity. The seal of the membrane wiper 150 opens to allow the surgical rod to pass there through. At step 440, the user starts the drive device, so that it rotates the shank 105 and the cutting bit 155. At step 450, the user applies force on the surgical rod urging it against the cutting bit 155. This force is maintained for a period of time sufficient to allow the cutting bit 155 to remove enough material to chamfer or round the edges, and smooth the end, of the surgical rod, so that any burrs or other jagged edges are removed. The precise period of time may depend on the hardness of the surgical rod, and the force applied upon the surgical rod by the user. Any chips, particles or dust created during by the cutting bit are substantially retained in the inner cavity. At step 460, after the period of time, the user removes the end of the surgical rod from the disposable surgical rod deburrer 100, sliding it in a distal direction 125 from the rod guide 130. The seal of the membrane wiper 150 may wipe the surgical rod as it is removed, so that any chips, particles or dust that may have clung to the rod are left in the inner cavity. The seal then closes. The drive device may be shut off. At step 470, if another surgical rod requires deburring during the same surgical procedure, steps 420-460 may are repeated, up to a maximum number to times supported by the disposable surgical rod deburrer (e.g., up to 6 uses). Otherwise, at step 480, the disposable surgical rod deburrer 100 is disposed of as waste (e.g., as hazardous waste) with the chips, particles or dust still within the inner cavity.

While the above description discusses specific examples of one embodiment of a disposable surgical rod deburrer, it should be apparent that a variety of other embodiments are possible, that may include a subset of these components, adaptations of these components, or different components that provide similar or related functions. Modifications and/or additions may be made without departing from the disclosure's intended spirit and scope. It should be understood that other embodiments may be constructed from any of variety of different materials, or combinations of different materials. It should also be understood that other embodiments, and the components thereof, may be constructed in any of a variety of sizes. Further, it should be understood that other embodiments may be designed as reusable products, rather than as a single-use disposable product. In such reusable embodiments, materials that withstand repeated use and do not degrade significantly when subject to common sterilization procedures may be utilized. In general, it should be understood that the above description is meant to be taken only by way of example.

What is claimed is:
1. A disposable surgical rod deburrer comprising:
   a shank configured to be rotated by a drive device; and
   a housing assembly coupled to the shank, the housing assembly including:
      a distal cap,
      a rod guide having an opening sized to receive and stabilize a solid, cylindrical surgical rod when inserted therethrough into an inner cavity of the disposable surgical rod deburrer, a portion of the rod guide extending through the distal cap and is retained therein by a retaining nut to form a rotatable coupling, the rotatable coupling to allow the rod guide to freely rotate with respect to the distal cap and other portions of the disposable surgical rod deburrer,
      a cutting hit disposed within the inner cavity, the cutting bit rigidly coupled to the shank and configured to rotate when the shank is rotated, and positioned to engage an edge about an end of the solid, cylindrical surgical rod to deburr the end of the solid, cylindrical surgical rod,
      a membrane wiper, the membrane wiper having a seal that opens to allow the solid, cylindrical surgical rod to be inserted therethrough and extend into the inner cavity, and substantially closes when the solid, cylindrical surgical rod is removed from the inner cavity, and
      a drive body that encloses at least of the inner cavity, wherein the membrane wiper retains within the inner cavity chips, particles or dust created by the cutting bit.

2. The disposable surgical rod deburrer of claim 1, wherein the seal is an iris seal formed from a plurality of bisecting slits in an elastic material.

3. The disposable surgical rod deburrer of claim 1, wherein the distal cap at least partially surrounds the rod guide.

4. The disposable surgical rod deburrer of claim 1, wherein the membrane wiper is located between the rod guide and the retaining nut.

5. The disposable surgical rod deburrer of claim 1, wherein the drive body is rigidly coupled to the distal cap.

6. The disposable surgical rod deburrer of claim 5, wherein the distal cap includes one or more teeth, and the drive body includes one or more corresponding slots that engage the teeth, forming a mechanical connection that prevents rotation therebetween.

7. The disposable surgical rod deburrer of claim wherein the cutting bit is an end mill.

8. The disposable surgical rod deburrer of claim 1, wherein the housing assembly further includes:
   a cutting bit holder to which the cutting bit is rigidly coupled.

9. The disposable surgical rod deburrer of claim 8, wherein the cutting bit includes a slotted portion, and the cutting bit holder includes a corresponding recess, the slotted portion extending into the corresponding recess to provide a mechanical connection that prevents rotation therebetween.

10. The disposable surgical rod deburrer of claim 8, wherein the cutting bit holder is rigidly coupled to the drive body.

11. The disposable surgical rod deburrer of claim 10, wherein the cutting bit holder includes one or more teeth, and the drive body includes one or more corresponding slots that engage the teeth forming a mechanical connection that prevents rotation therebetween.

12. The disposable surgical rod deburrer of claim 1, wherein a component of the disposable surgical rod deburrer is constructed of a material that substantially degrades when exposed to autoclave temperatures to prevent reuse of the disposable surgical rod deburrer after autoclave sterilization.

13. The disposable surgical rod deburrer of claim 12, wherein the material tolerates at least one of ethylene oxide (ETO) or gamma sterilization.

14. A surgical rod deburrer comprising:

a distal cap;

a rod guide having an opening sized to receive and stabilize a solid, cylindrical surgical rod when inserted therethrough into an inner cavity of the disposable surgical rod deburrer, and a portion of the rod guide extends through the distal cap and is retained therein to form a rotatable coupling, the rotatable coupling to allow the rod guide to freely rotate with respect to the distal cap;

a cutting bit disposed within the inner cavity and configured to, when rotated, engage an edge about an end of the solid, cylindrical surgical rod to deburr the end of the solid, cylindrical surgical rod;

a membrane wiper disposed between the rod guide and the cutting bit, the membrane wiper having a seal that opens to allow the solid, cylindrical surgical rod to be inserted therethrough and enter the inner cavity, and substantially closes when the solid, cylindrical surgical rod is removed from the inner cavity; and a drive body that encloses at least a portion of the inner cavity, wherein the membrane wiper retains within the inner cavity chips, particles or dust created by the cutting bit.

15. The surgical rod deburrer of claim 14, wherein the seal is an iris seal formed from a plurality of bisecting slits in an elastic material.

16. The surgical rod deburrer of claim 14, wherein the surgical rod deburrer is a single-use disposable product.

* * * * *